United States Patent
Ye et al.

(10) Patent No.: US 10,235,321 B2
(45) Date of Patent: Mar. 19, 2019

(54) STACKING MODULAR INSTRUMENT SYSTEM

(71) Applicant: ZHEJIANG UNIVERSITY, Hangzhou, Zhejiang (CN)

(72) Inventors: Lingyun Ye, Zhejiang (CN); Xinglin Sun, Zhejiang (CN); Caixia Li, Zhejiang (CN); Kaichen Song, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 0 days.

(21) Appl. No.: 15/553,713

(22) PCT Filed: May 3, 2016

(86) PCT No.: PCT/CN2016/080862
§ 371 (c)(1),
(2) Date: Aug. 25, 2017

(87) PCT Pub. No.: WO2017/190264
PCT Pub. Date: Nov. 9, 2017

(65) Prior Publication Data
US 2018/0173663 A1    Jun. 21, 2018

(51) Int. Cl.
*G06F 13/40* (2006.01)

(52) U.S. Cl.
CPC .......... *G06F 13/4027* (2013.01); *G06F 13/40* (2013.01); *G06F 13/4095* (2013.01)

(58) Field of Classification Search
CPC ... G06F 13/4027; G06F 13/4095; G06F 13/40
See application file for complete search history.

(56) References Cited

U.S. PATENT DOCUMENTS

| | | | | |
|---|---|---|---|---|
| 6,076,142 A | * | 6/2000 | Corrington | ............. G06F 1/184 710/306 |
| 6,611,853 B2 | * | 8/2003 | Graafmans | ...... G01R 31/31907 700/298 |
| 7,096,091 B2 | * | 8/2006 | Haas | .................. G01N 35/0092 414/799 |
| 2007/0094946 A1 | * | 5/2007 | Schoeny | ................... E04H 5/02 52/79.1 |

(Continued)

*Primary Examiner* — Jing-Yih Shyu (57) ABSTRACT

A stacking modular instrument bus device includes N instrument sub-modules, N+1 customized bus connectors, a first bus termination module and a second bus termination module. The N instrument sub-modules are connected with each other in series through the N−1 customized bus connectors to form an instrument sub-system, two ends of the N instrument sub-modules are respectively connected with the first bus termination module and the second bus termination module through one customized bus connector; each of the instrument sub-modules includes a bus unit and a functional unit. The present invention can freely stack and combine all the instrument sub-modules in the manner of building blocks, which is divorced from the conventional backboard type structure and becomes more flexible. Every instrument sub-module has the independent and complete instrument structure and form the system itself. The bus unit of the instrument sub-module is detached from the functional unit thereof.

6 Claims, 3 Drawing Sheets

(56) References Cited

U.S. PATENT DOCUMENTS

| | | | |
|---|---|---|---|
| 2007/0217169 A1* | 9/2007 | Yeap | H05K 7/1461 361/752 |
| 2013/0120241 A1* | 5/2013 | Czupi | G06F 3/01 345/156 |
| 2015/0356051 A1* | 12/2015 | Benson | G06F 1/16 710/313 |

* cited by examiner

STACKING MODULAR INSTRUMENT SYSTEM

CROSS REFERENCE OF RELATED APPLICATION

This is a U.S. National Stage under 35 U.S.C 371 of the International Application PCT/CN2016/080862, filed May 3, 2016.

BACKGROUND OF THE PRESENT INVENTION

Field of Invention

The present invention relates to the measuring instrument field, and more particularly to the field of the modular instrument bus device.

Description of Related Arts

With the increasing complexity of test tasks (such as ground simulation test systems and radar test systems of warships, spacecrafts and missiles), each test often requires a variety of instruments to work together. Therefore, most of these measurements need a dedicated test system; and however, the currently developed test systems have a high degree of customization and poor adaptability, when test objects and even the models of the test objects change, the collaborative combination modes and the test protocols will change, so that the hardware and software of the instruments and the test systems need to be re-customized, which not only causes the serious waste, but also brings a lot of inconveniences to the equipment testing and maintenance, thereby seriously affecting the equipment research, development and upgrading. As a result, the modular instrument system will become the mainstream of the future development of scientific instruments.

However, existing modular instrumentation systems, such as the modular instrument system based on the PXI instrument bus manufactured by American National Instruments NI Company, the modular instrument system based on the VXI instrument bus manufactured by American Keysight (formerly Agilent) Company, adopt the backboard chassis type hardware structure. The backboard chassis type modular instruments have drawbacks as follows. An extensible maximum amount of the instruments is limited by the card slots. For example, at most ten instrument modules are able to be inserted into the backboard chassis type instrument with ten card slots; if the instrument system needs more modules, it is necessary to replace the chassis structure or use two instruments to work together. A minimum volume of the instrument is limited by the minimum size of the chassis. For example, one simple instrument system only needs 2-3 instrument modules to complete the test task, and however, the existing chassis is a backboard chassis with ten card slots, the volume of the above simple instrument system is same as the volume of an instrument system comprising ten instrument modules, and is unable to be further decreased.

SUMMARY OF THE PRESENT INVENTION

To overcome drawbacks of existing backboard chassis type modular instruments such as poor extensibility and low flexibility, the present invention provides a stacking modular instrument bus device for truly flexibly configuring the modular instrument.

The object of the present invention is achieved through the technical solution as follows. A stacking modular instrument bus device comprises: N instrument sub-modules, N+1 customized bus connectors, a first bus termination module and a second bus termination module, wherein N is a natural number.

The N instrument sub-modules are connected with each other in series through the N−1 customized bus connectors to form an instrument sub-system. One end of the instrument sub-system is connected with the first bus termination module through one customized bus connector, and the other end thereof is connected with the second bus termination module through another customized bus connector. The customized bus connectors are able to be detached from the instrument sub-modules, the first bus termination module and the second bus termination module, thus achieving separation and reorganization among the instrument sub-modules, which is more flexible.

Preferably, each of the instrument sub-modules comprises a bus unit and a functional unit connected with the bus unit through a port adapting device.

The bus unit of every instrument sub-module is adapted for achieving the instrument bus function. Generally, the bus unit comprises a bus adapter, a port adapter, a bus driver, a power manager and a bus protocol manager, wherein the bus adapter is adapted for physically connecting instrument buses among the multiple instrument sub-modules; the port adapter is adapted for connecting the functional unit; the power manager is adapted for distributing and managing power source which is transferred on the instrument buses, and monitoring power supply of the instrument system; the bus protocol manager is adapted for achieving protocol function of the instrument buses; the bus driver is adapted for connecting instrument bus signal between the bus adapter and the bus protocol manager. The method for achieving circuit function of the bus unit is not the scope of protection of the present invention, so the other parts except the bus adapter and the port adapter are not described here in detail.

The functional unit of every instrument sub-module is adapted for achieving specific circuit function of the corresponding instrument sub-module. For example, the functional unit of a power supply instrument sub-module generally comprises a power conversion circuit and a power monitoring circuit besides the port adapter connecting with the bus unit; and the functional unit of the RS-485 protocol based instrument sub-module generally comprises a RS-485 communication interface socket, a RS-485 interface chip, an FPGA and a DSP besides the port adapter connecting with the bus unit. The method for achieving the hardware structure of the functional unit is not the scope of protection of the present invention, so the other parts except the port adapter are not described here in detail.

It can be seen from the use and function of the bus unit and the functional unit of every instrument sub-module, for various instrument sub-modules, only the corresponding functional units need to be separately designed, the bus units can be of the same design. Therefore, the design, in which the bus unit and the functional unit of every instrument sub-module are separately designed, is more conducive to the development and upgrading of the instrument system.

Preferably, the port adapting device comprises a bus unit port adapter and a functional unit port adapter, wherein: the bus unit port adapter is located at an edge of the bus unit of each of the instrument sub-modules, and the functional unit port adapter is located at an edge of the functional unit of each of the instrument sub-modules. The bus unit port adapter and the functional unit port adapter are a pair of board indirect plug-ins with identical pin definition.

Preferably, the pin definition of each of the board indirect plug-ins comprises power and signal, wherein: the signal comprises one or more standard interface modes selected from a group consisting of UART (Universal Asynchronous Receiver-transmitter), SPI (Serial Peripheral Interface), asynchronous peripheral parallel interface, synchronous peripheral parallel interface, PCIe (Peripheral Component Interconnect Express) and SRIO (Serial RapidIO);

the power in the pin definition of each of the board indirect plug-ins is mainly from the power manager of the bus unit of every instrument sub-module, so as to provide a total power source for the functional unit of every instrument sub-module; the signal in the pin definition of each of the board indirect plug-ins is adapted for transmitting data between the bus unit and the functional unit connected therewith of every instrument sub-module and for controlling the functional unit through the bus unit connected therewith of every instrument sub-module. The data transmission method, control method and power control and management method are not the scope of protection of the present invention, so no description is further provided here in detail.

Preferably, the bus unit of every instrument sub-module comprises a bus unit port adapter, a first module bus adapter and a second module bus adapter, wherein the first module bus adapter and the second module bus adapter are respectively located at a top layer and a bottom layer of a PCB of the bus unit of every instrument sub-module.

Preferably, the first bus termination module comprises an instrument housing structure having a handle at a left side thereof and a first termination module circuit board, wherein: the first termination module circuit board is located at a right side of the instrument housing structure having the handle at the left side thereof; the second bus termination module comprises an instrument housing structure having a handle at a right side thereof and a second termination module circuit board, wherein: the second termination module circuit board is located at a left side of the instrument housing structure having the handle at the right side thereof.

Preferably, the first termination module circuit board comprises a first termination bus adapter located at a right side thereof, and the second termination module circuit board comprises a second termination bus adapter located at a left side thereof.

Preferably, all of the first module bus adapter, the second module bus adapter, the first termination bus adapter and the second termination bus adapter have same structure and definition, and are called as bus adapters. Every bus adapter comprises M surface-mounted vertical sockets, wherein M is a natural number.

Preferably, the M surface-mounted vertical sockets are arranged along a straight line; the pin definition of each of the M surface-mounted vertical sockets comprises instrument bus power and instrument bus signal, wherein: the instrument bus power comprises multiple voltage amplitudes, the instrument bus signal is divided to two types according to a level standard of, CAN (Controller Area Network) differential signals and MLVDSs (Multipoint Low Voltage Differential Signals).

Preferably, each of the customized bus connectors comprises K bus connecting PCBs, two ends of each of which have gold finger structures, respectively, wherein K is a natural number smaller than and equal to M; the gold finger structures of each of the bus connecting PCBs are adapted for being inserted into the sockets of the bus adapters to achieve electrical connection.

Preferably, there are three connection methods of the customized bus connectors: the first connection method is that one end of every customized bus connector is connected with the first termination bus adapter and the other end thereof is connected with the second module bus adapter of the corresponding instrument sub-module; the second connection method is that one end of every customized bus connector is connected with the first module bus adapter of one instrument sub-module, the other end thereof is connected with the second module bus adapter of another instrument sub-module; the third connection method is that one end of every customized bus connector is connected with the first module bus adapter of one instrument sub-module, the other end thereof is connected with the second termination bus adapter.

Every instrument sub-module comprises a bus unit and a functional unit, wherein the bus unit of every instrument sub-module is adapted for achieving the instrument bus function of the stacking modular instrument system; the functional unit of every instrument sub-module is adapted for achieving the specific function of the corresponding instrument sub-module; various instrument sub-modules are different in the functional unit and basically same in the bus unit.

Preferably, the bus unit of every instrument sub-module comprises a bus unit port adapter, a first module bus adapter located at a top layer of a circuit board of the bus unit, a second module bus adapter located at a bottom layer of the circuit board of the bus unit, and a circuit unit related with the bus manager; the functional unit of every instrument sub-module comprises a functional unit port adapter and a circuit unit for achieving the specific function of the instrument sub-module. The bus unit port adapter of the bus unit of every instrument sub-module is connected with the functional unit port adapter of the functional unit of the corresponding instrument sub-module, so as to connect the power and signal between the bus unit and the functional unit of every instrument sub-module. The first module bus adapter and the second module bus adapter are connected with each other through PCB through-holes, so as to penetrate the power and signal of the stacking modular instrument bus on the bus unit circuit board.

Preferably, the first bus termination module comprises an instrument housing structure having a handle at a left side thereof and a first termination module circuit board; the second bus termination module comprises an instrument housing structure having a handle at a right side thereof and a second termination module circuit board. The first termination module circuit board comprises a first termination bus adapter and a corresponding termination circuit unit; the second termination module circuit board comprises a second termination bus adapter and a corresponding termination circuit unit. The first termination module circuit board and the second termination module circuit board are adapted for matching termination impedances of the stacking modular instrument bus. The instrument housing structure having the handle is mainly adapted for supporting, protecting and carrying the instrument structure.

Preferably, every customized bus connector is a PCB, the PCB has two gold finger structures respectively at two ends thereof, the two gold finger structures are able to be inserted into the first module bus adapter, the second module bus adapter, the first termination bus adapter and the second termination bus adapter, so as to electrically connect the stacking modular instrument buses. Every customized bus connector has an ability of transmitting high-speed digital signals, which ensures signal integrity and power integrity of the stacking modular instrument buses. Every customized bus connector is coated with an insulating wear-resistant resin material for protection.

Preferably, the first termination bus adapter is connected with the second module bus adapter of the first instrument sub-module through the first customized bus connector; the second module bus adapter of the first instrument sub-module is connected with the first module bus adapter thereof through PCB through-holes; the first module bus adapter of the first instrument sub-module is connected with the second module bus adapter of the second instrument bus-module through the second customized bus connector; and so on, till the first module bus adapter of the $N^{th}$ instrument sub-module is connected with the second termination bus adapter through the $N+1^{th}$ customized bus connector, so as to form an instrument bus plane which is vertical to the bus unit circuit board, for transmitting the power and signal of the stacking modular instrument bus among all instrument sub-module bus units, the first termination module circuit board and the second termination module circuit board.

Preferably, all of the first termination bus adapter, the second termination bus adapter, the first module bus adapter and the second module bus adapter have the same hardware structure and pin definition, each of which comprises M surface-mounted vertical sockets for transmitting the power and signal of the stacking modular instrument bus, wherein M is a natural number. The power of the stacking modular instrument bus has multiple voltage amplitudes, is configured according to actual requirements, and is from an instrument sub-module with power supply function in the stacking modular instrument system. The signal of the stacking modular instrument bus is divided into two kinds according to a level standard of, CAN Controller Area Network) differential signals and MLVDSs (Multipoint Low Voltage Differential Signals); wherein the CAN differential signals are adapted for achieving the module management and fault diagnosis of the stacking modular instrument system; and the MLVDSs are adapted for achieving the synchronization, triggering and data transmission of the stacking modular instrument system.

Preferably, the bus manager comprises a power manager, a bus driver and a bus protocol manager. The power manager is adapted for distributing and managing the power of the stacking modular instrument bus and achieving the power monitoring; the bus protocol manager is adapted for achieving the protocol function of the stacking modular instrument bus; the bus driver is adapted for introducing the signals of the stacking modular instrument bus into the bus protocol manager.

Preferably, both of the bus unit port adapter and the functional unit port adapter respectively comprise two board indirect plug-ins, the two board indirect plug-ins are used in pairs. The two board indirect plug-ins of the bus unit port adapter and the functional unit port adapter have identical pin definition, the pin definition comprises power and signal. The bus unit port adapter and the functional unit port adapter are mainly adapted for connecting the bus manager of the bus unit of the instrument sub-module and the circuit unit of the functional unit of the instrument sub-module.

Preferably, the power of the bus unit port adapter and the functional unit port adapter is from the power manager of the bus manager of the bus unit of every instrument sub-module, so as to provide a total power source for the circuit unit of the functional unit of every instrument sub-module. The signal of the bus unit port adapter and the functional unit port adapter are adapted for achieving data transmission, control and state reading of the bus protocol manager of the bus manager of the bus unit of every instrument sub-module through the circuit unit of the functional unit of the corresponding instrument sub-module; the signal comprises UART (Universal Asynchronous Receiver-transmitter), SPI (Serial Peripheral Interface), asynchronous peripheral parallel interface, synchronous peripheral parallel interface, PCIe (Peripheral Component Interconnect Express) and SRIO (Serial RapidIO) standard interface modes; and can be selected according to the requirement of the functional unit of every instrument sub-module.

The present invention has beneficial effects as follows. The stacking modular instrument bus device, provided by the present invention, can freely stack and combine all the instrument sub-modules in the manner of building blocks, which is divorced from the conventional backboard type structure and becomes more flexible. Every instrument sub-module has the independent and complete instrument structure, and forms the system itself. The bus unit of every instrument sub-module is detached from the functional unit of the corresponding instrument sub-module. The present invention adopts the independent single-board design, which is more conducive to update the instrument bus system, thus saving the development time and design cost.

BRIEF DESCRIPTION OF THE DRAWINGS

To more clearly illustrate the technical solution in the embodiments of the present invention, the drawings, which are used in the description of the embodiments, are briefly described as follows.

In the drawing, 1: first bus termination module; 2: instrument sub-module; 3: second bus termination module; 4: customized bus connector; 5: bus unit of instrument sub-module; 51: bus unit port adapter; 52: first module bus adapter; 53: second module bus adapter; 54: bus unit circuit board; 6: functional unit of instrument sub-module; 61: functional unit port adapter; 7: first termination module circuit board; 71: first termination bus adapter; 8: second termination module circuit board; 81: second termination bus adapter.

DETAILED DESCRIPTION OF THE PREFERRED EMBODIMENT

To make the objects, technical solutions and advantages of the embodiments of the present invention more clearly, the technical solutions in the embodiments of the present invention will be described more clearly and completely with the accompanying drawings as follows. Obviously, the embodiments are part of the present invention, not all embodiments. According to embodiments of the present invention, other embodiments obtained by those of ordinary skill in the art without making creative work are within the scope of the present invention.

The present invention provides a stacking modular instrument bus device, which comprises N instrument sub-modules 2, N+1 customized bus connectors 4, a first bus termination module 1 and a second bus termination module 3, wherein N is a natural number.

Figure 1:
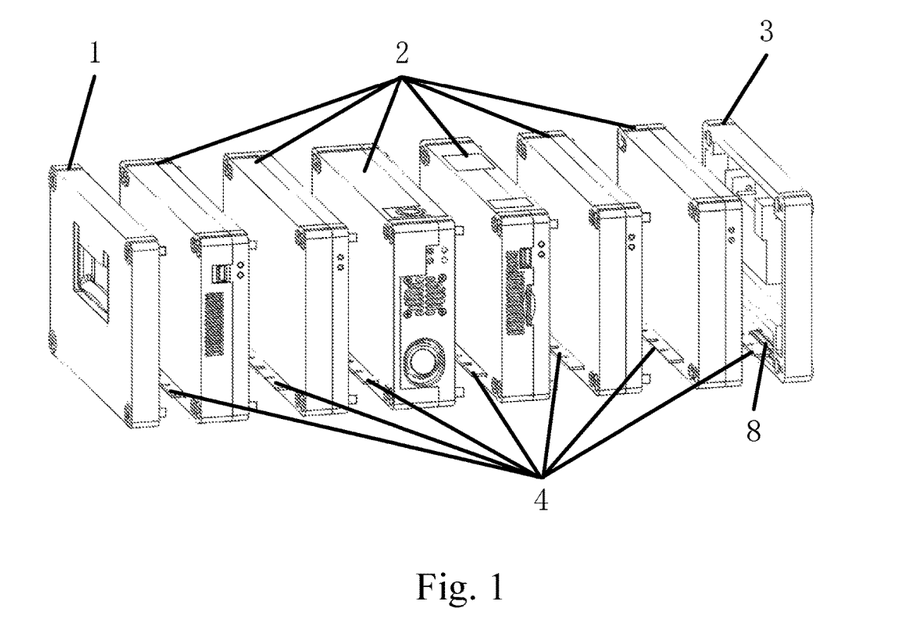
FIG. 1 is a system structure diagram of a stacking modular instrument bus device according to a preferred embodiment of the present invention.

As shown in FIG. 1, the N instrument sub-modules 2 are connected with each other in series through the N−1 customized bus connectors 4 to form an instrument sub-system. One end of the instrument sub-system is connected with the first bus termination module 1 through one customized bus connector 4, and the other end thereof is connected with the second bus termination module 3 through one customized bus connector 4. The customized bus connectors 4 are able to be detached from the instrument sub-modules 2, the first bus termination module 1 and the second bus termination module 3, thus achieving separation and reorganization among the instrument sub-modules, which is more flexible.

Each of the instrument sub-modules 2 comprises a bus unit 5 and a functional unit 6 connected with the bus unit 5 through a port adapting device.

The port adapting device comprises a bus unit port adapter 51 and a functional unit port adapter 61; wherein: the bus unit port adapter 51 is located at an edge of the bus unit 5 of each of the instrument sub-modules, and the functional unit port adapter 61 is located at an edge of the functional unit 6 of each of the instrument sub-modules.

Figure 3:
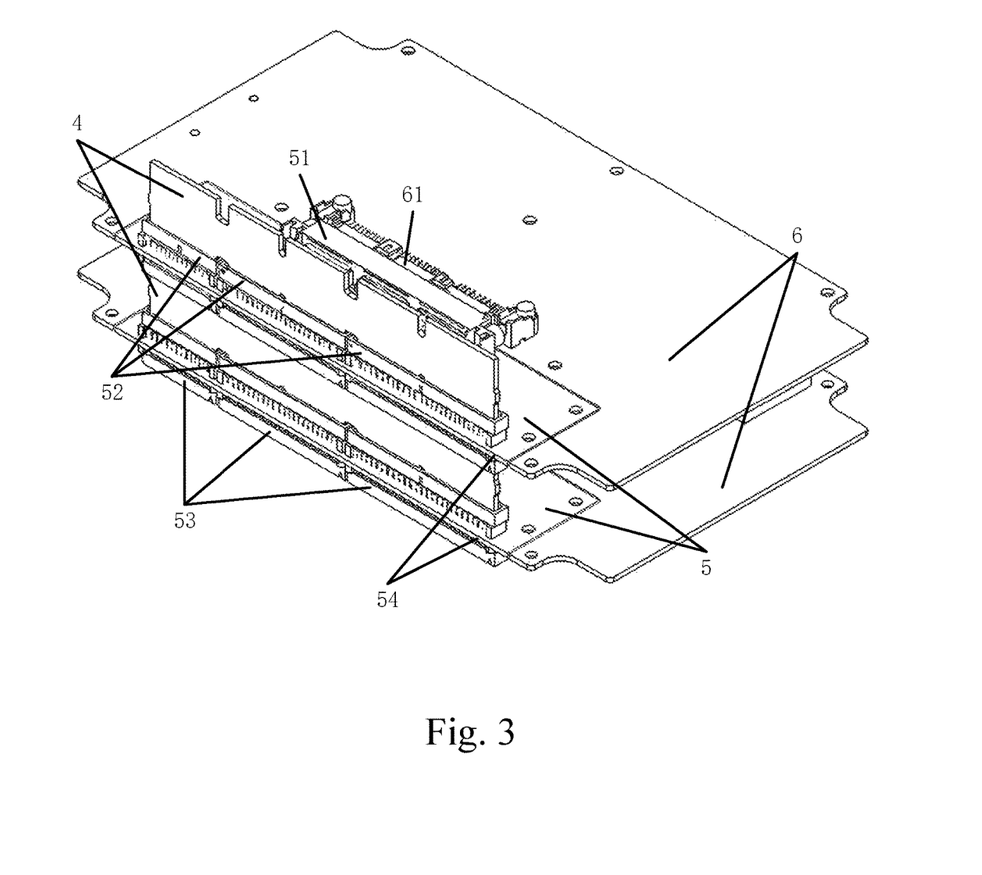
FIG. 3 is a partially schematic diagram of the stacking modular instrument bus device according to the preferred embodiment of the present invention.

The bus unit port adapter 51 and the functional unit port adapter 61 are a pair of board indirect plug-ins with identical pin definition. In FIG. 3, the bus unit port adapter 51 adopts QFS-078-01-SL-D-RA manufactured by SAMTEC Company, and the functional unit port adapter 61 adopts QMS-078-01-SL-D-RA manufactured by SAMTEC Company.

The bus unit of every instrument sub-module is adapted for achieving the instrument bus function. Generally, the bus unit comprises a bus adapter, a port adapter, a bus driver, a power manager and a bus protocol manager, wherein the bus adapter is adapted for physically connecting the instrument buses between multiple instrument sub-modules; the port adapter is adapted for connecting the functional units; the power manager is adapted for distributing and managing power source which is transferred on the instrument buses, and realizing the power monitoring of the instrument system; the bus protocol manager is adapted for achieving the protocol function of the instrument buses; the bus driver is adapted for connecting instrument bus signals between the bus adapter and the bus protocol manager. The method for achieving the circuit function of the bus unit is not the scope of protection of the present invention, so the other parts except the bus adapter and the port adapter are not described here in detail.

The functional unit of every instrument sub-module is adapted for achieving the specific circuit function of the corresponding instrument sub-module. For example, the functional unit of a power supply instrument sub-module generally comprises a power conversion circuit and a power monitoring circuit besides the port adapter connecting with the bus unit; and however, the functional unit of a RS-485 protocol based instrument sub-module generally comprises a RS-485 communication interface socket, a RS-485 interface chip, an FPGA and a DSP besides the port adapter connecting with the bus unit. The method for achieving the hardware structure of the functional unit is not the scope of protection of the present invention, so the other parts except the port adapter are not described here in detail.

It can be seen from the use and function of the bus unit and the functional unit of every instrument sub-module, for various instrument sub-modules, only the corresponding functional units need to be separately designed, the bus units can be of the same design. Therefore, the design, in which the bus unit and the functional unit of every instrument sub-module are separately designed, is more conducive to the development and upgrading of the instrument system.

The pin definition of both the bus unit port adapter 51 and the functional unit port adapter 61 comprises power and signal, wherein: the power is mainly from the power manager of the bus unit of every instrument sub-module, so as to provide a total power source for the functional unit 6 of the corresponding instrument sub-module; the signal comprises one or more standard interface modes selected from a group consisting of UART (Universal Asynchronous Receiver-transmitter), SPI (Serial Peripheral Interface), asynchronous peripheral parallel interface, synchronous peripheral parallel interface, PCIe (Peripheral Component Interconnect Express) and SRIO (Serial RapidIO), so as to transmit data between the bus unit 5 and the functional unit 6 connected therewith of every instrument sub-module and to control the functional unit 6 through the bus unit 5 connected therewith of every instrument sub-module. The data transmission method, control method and power control and management method are not the scope of protection of the present invention, so no description is further provided here in detail.

Referring to FIG. 3, the bus unit 5 of every instrument sub-module comprises a first module bus adapter 52 and a second module bus adapter 53 which are respectively located at a top layer and a bottom layer of a PCB (Printed Circuit Board) of the bus unit 5 of every instrument sub-module.

Referring to FIG. 1, the first bus termination module 1 comprises an instrument housing structure having a handle at a left side thereof and a first termination module circuit board 7, wherein: the first termination module circuit board 7 is located at a right side of the instrument housing structure having the handle at the left side thereof; the second bus termination module 3 comprises an instrument housing structure having a handle at a right side thereof and a second termination module circuit board 8, wherein: the second termination module circuit board 8 is located at a left side of the instrument housing structure having the handle at the right side thereof.

Figure 2:
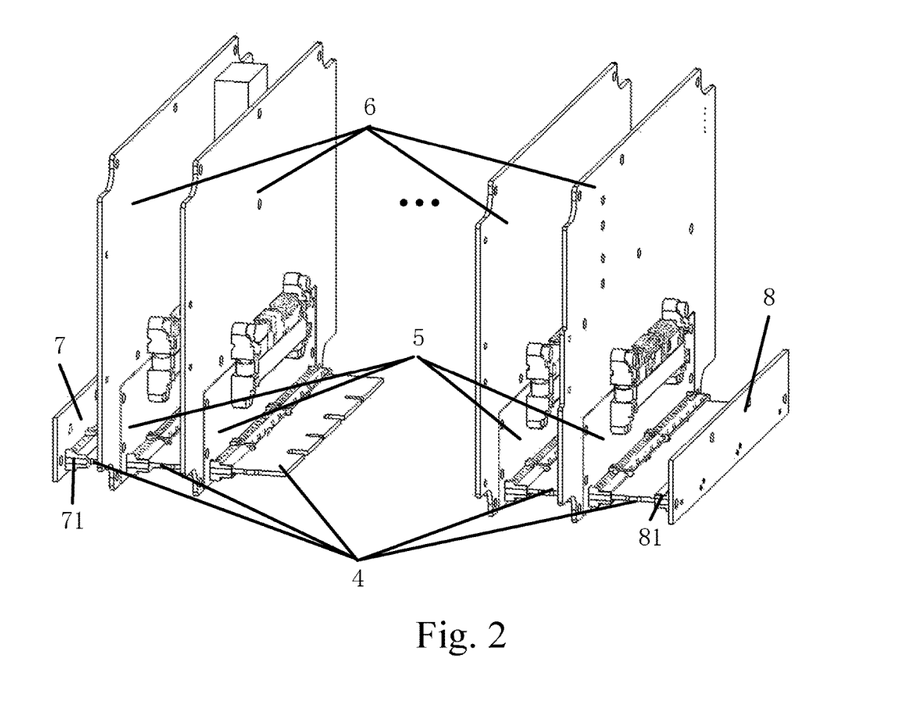
FIG. 2 is an internal connection diagram of the stacking modular instrument bus device according to the preferred embodiment of the present invention.

Referring to FIG. 2, the first termination module circuit board 7 comprises a first termination bus adapter 71 located at a right side thereof, and the second termination module circuit board 8 comprises a second termination bus adapter 81 located at a left side thereof.

All of the first module bus adapter 52, the second module bus adapter 53, the first termination bus adapter 71 and the second termination bus adapter 81 have the same structure and definition, and are called as bus adapters. Each of the bus adapters comprises M surface-mounted vertical sockets, wherein M is natural number.

In FIGS. 2 and 3, each of the bus adapters comprises three surface-mounted vertical sockets which are arranged along a straight line. The three surface-mounted vertical sockets adopt HSEC8-DV series of connectors manufactured by SAMTEC Company and have the product model of HSEC8-130-01-L-DV-A, HSEC8-150-01-L-DV-A and HSEC8-160-01-L-DV-A, respectively.

The pin definition of each of the bus adapters comprises instrument bus power and instrument bus signal, wherein: the instrument bus power comprises multiple voltage amplitudes; the instrument bus signal is divided to two types according to a level standard of, CAN (Controller Area Network) differential signals and MLVDSs (Multipoint Low Voltage Differential Signals).

Each of the customized bus connectors 4 comprises K bus connecting PCBs, two ends of each of which have gold finger structures, respectively, wherein K is a natural number smaller than and equal to M; the gold finger structures of each of the bus connecting PCBs are adapted for being inserted into the sockets of each of the bus adapters to achieve the electrical connection.

In FIGS. 1, 2 and 3, each of the customized bus connectors 4 comprises a bus connecting PCB, two ends of which have the gold finger structures, respectively. A thickness of the bus connecting PCB, determined by the model of the sockets on each of the bus adapters, is 1.6 mm. A length of the bus connecting PCB is determined by a total length and arrangement gaps of HSEC8-130-01-L-DV-A, HSEC8-150-01-L-DV-A and HSEC8-160-01-L-DV-A. A width of the bus connecting PCB is determined by thicknesses of the housings of the two instrument sub-modules connected with the bus connecting PCB.

There are three connection methods of the customized bus connectors 4: the first connection method is that one end of every customized bus connector is connected with the first termination bus adapter 71 and the other end thereof is connected with the second module bus adapter 53 of the corresponding instrument sub-module; the second connection method is that one end of every customized bus connector is connected with the first module bus adapter 52 of one instrument sub-module, the other end thereof is connected with the second module bus adapter 53 of another instrument sub-module; the third connection method is that one end of every customized bus connector is connected with the first module bus adapter 52 of one instrument sub-module, the other end thereof is connected with the second termination bus adapter 81.

Figure 4:
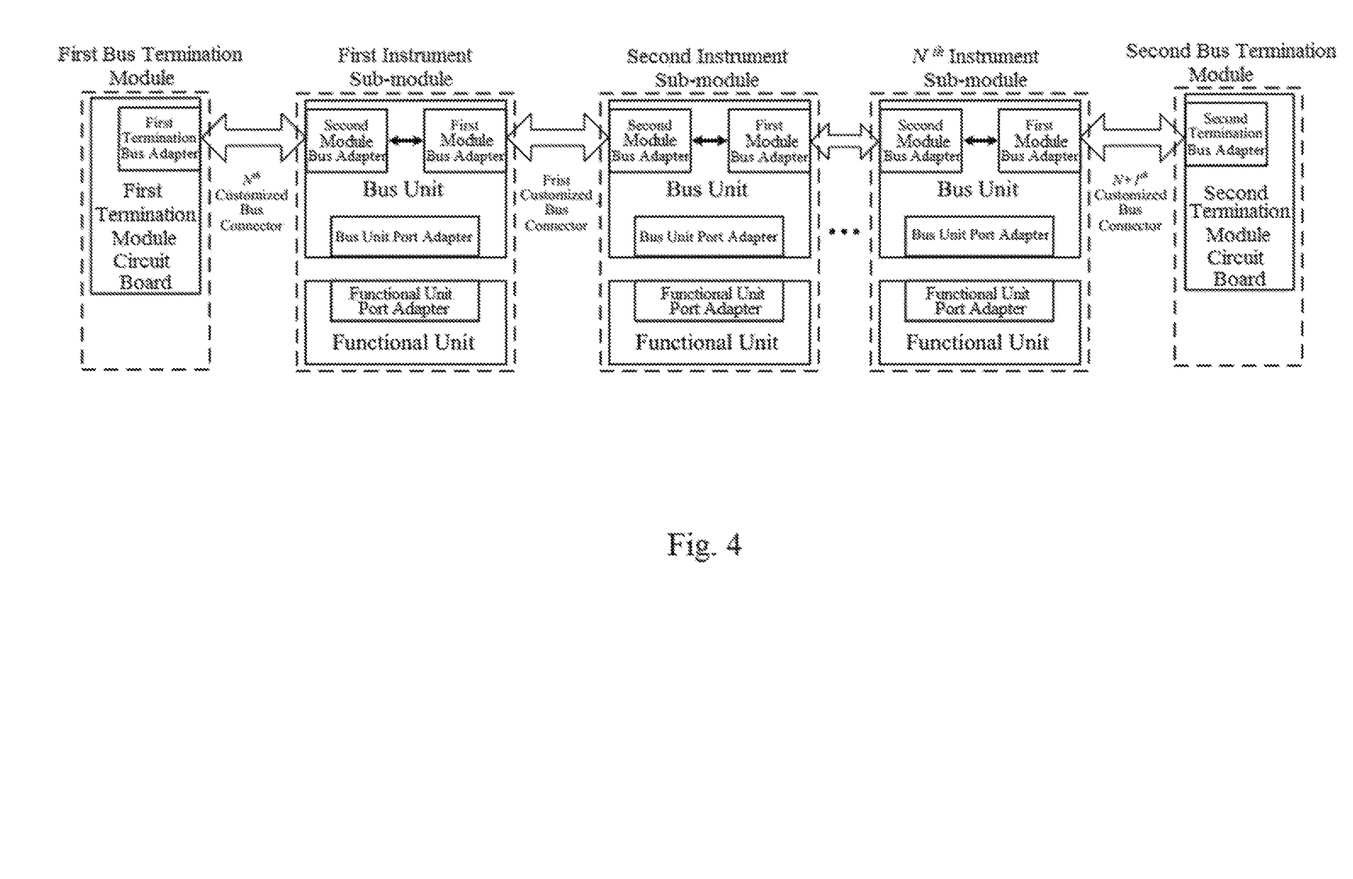
FIG. 4 is a connection diagram of the stacking modular instrument bus device according to the preferred embodiment of the present invention.

FIGS. 2-4 further illustrate the connection relationship of the stacking modular instrument bus device according to the preferred embodiment of the present invention. For a modular instrument system comprising N instrument sub-modules, the connection relationship among all parts is described as follows.

A bus unit 5 of every instrument sub-module is connected with a functional unit port adapter 61 of a functional unit 6 of the corresponding instrument sub-module to form an instrument sub-module.

A gold finger structure at one end of a first customized bus connector 4 is inserted into a vertical socket of a first module bus adapter 52 of a first instrument sub-module, a gold finger structure at another end of the first customized bus connector 4 is inserted into a vertical socket of a second module bus adapter 53 of a second instrument sub-module, for connecting the first instrument sub-module with the second instrument sub-module.

A gold finger structure at one end of a second customized bus connector 4 is inserted into a vertical socket of the first module bus adapter 52 of a second instrument sub-module, a gold finger structure at another end of the second customized bus connector 4 is inserted into a vertical socket of the second module bus adapter 53 of a third instrument sub-module, for connecting the second instrument sub-module with the third instrument sub-module.

The rest can be done in the same manner, and the connection of N instrument sub-modules is achieved through N−1 customized bus connectors 4 to from an instrument sub-system.

A gold finger structure at one end of an $N^{th}$ customized bus connector 4 is inserted into a vertical socket of a first termination bus adapter 71, a gold finger structure at another end of the $N^{th}$ customized bus connector 4 is inserted into a vertical socket of a second module bus adapter 53 of a first instrument sub-module, for connecting the instrument sub-system with the first bus termination module 1.

A gold finger structure at one end of an $N+1^{th}$ customized bus connector 4 is inserted into a vertical socket of a second termination bus adapter 81, a gold finger structure at another end of the $N+1^{th}$ customized bus connector 4 is inserted into a vertical socket of a first module bus adapter 52 of an $N^{th}$ instrument sub-module, for connecting the instrument sub-system with the second bus termination module 3.

What is not described in detail in the specification of the present invention belongs to the prior art known to those skilled in the art.

What is claimed is:

1. A stacking modular instrument bus device comprising: N instrument sub-modules, N+1 customized bus connectors, a first bus termination module and a second bus termination module, wherein N is a natural number;

the N instrument sub-modules are connected with each other in series through the N−1 customized bus connectors to form an instrument sub-system;

one end of the instrument sub-system is connected with the first bus termination module through one customized bus connector, and the other end thereof is connected with the second bus termination module through another customized bus connector;

each of the instrument sub-modules comprises a bus unit and a functional unit connected with the bus unit through a port adapting device;

the bus unit of every instrument sub-module comprises a first module bus adapter and a second module bus adapter which are respectively located at a top layer and a bottom layer of a PCB (Printed Circuit Board) of the bus unit of the corresponding instrument sub-module;

the first bus termination module comprises an instrument housing structure having a handle at a left side thereof and a first termination module circuit board; the first termination module circuit board is located at a right side of the instrument housing structure having the handle at the left side thereof; the second bus termination module comprises an instrument housing structure having a handle at a right side thereof and a second termination module circuit board; the second termination module circuit board is located at a left side of the instrument housing structure having the handle at the right side thereof;

the first termination module circuit board comprises a first termination bus adapter located at a right side thereof, and the second termination module circuit board comprises a second termination bus adapter located at a left side thereof;

each of the first module bus adapter, the second module bus adapter, the first termination bus adapter and the second termination bus adapter comprises M surface-mounted vertical sockets, here M is a natural number;

the M surface-mounted vertical sockets are arranged along a straight line; the pin definition of the M surface-mounted vertical sockets comprises instrument bus power and instrument bus signal; the instrument bus power comprises multiple voltage amplitudes; the instrument bus signal is divided to two types according to a level standard of, CAN (Controller Area Network) differential signals and MLVDSs (Multipoint Low Voltage Differential Signals).

2. The stacking modular instrument bus device, as recited in claim 1, wherein: each of the customized bus connectors comprises K bus connecting PCBs (Printed Circuit Boards), two ends of each of which have gold finger structures, respectively, here K is a natural number smaller than and equal to M; the gold finger structures of each of the bus connecting PCBs are adapted for being inserted into the sockets of the bus adapters to achieve electrical connection;

there are three connection methods of the customized bus connectors, a first connection method is that one end of every customized bus connector is connected with the first termination bus adapter and the other end thereof is connected with the second module bus adapter of a corresponding instrument sub-module; the second connection method is that one end of every customized bus connector is connected with the first module bus adapter of one instrument sub-module, the other end thereof is connected with the second module bus adapter of another instrument sub-module; the third connection method is that one end of every customized bus connector is connected with the first module bus adapter of one instrument sub-module, the other end thereof is connected with the second termination bus adapter.

3. The stacking modular instrument bus device, as recited in claim 1, wherein: the port adapting device comprises a bus unit port adapter and a functional unit port adapter; the bus unit port adapter is located at an edge of the bus unit of each of the instrument sub-modules, and the functional unit port adapter is located at an edge of the functional unit of the corresponding instrument sub-module.

4. The stacking modular instrument bus device, as recited in claim 2, wherein: the port adapting device comprises a bus unit port adapter and a functional unit port adapter; the bus unit port adapter is located at an edge of the bus unit of each of the instrument sub-modules, and the functional unit port adapter is located at an edge of the functional unit of the corresponding instrument sub-module.

5. The stacking modular instrument bus device, as recited in claim 3, wherein: the bus unit port adapter and the functional unit port adapter are a pair of board indirect plug-ins with identical pin definition; the pin definition of every board indirect plug-in comprises power and signal; the signal comprises one or more standard interface modes selected from a group consisting of UART (Universal Asynchronous Receiver-transmitter), SPI (Serial Peripheral Interface), asynchronous peripheral parallel interface, synchronous peripheral parallel interface, PCIe (Peripheral Component Interconnect Express) and SRIO (Serial RapidIO).

6. The stacking modular instrument bus device, as recited in claim 4, wherein: the bus unit port adapter and the functional unit port adapter are a pair of board indirect plug-ins with identical pin definition; the pin definition of every board indirect plug-in comprises power and signal; the signal comprises one or more standard interface modes selected from a group consisting of UART (Universal Asynchronous Receiver-transmitter), SPI (Serial Peripheral Interface), asynchronous peripheral parallel interface, synchronous peripheral parallel interface, PCIe (Peripheral Component Interconnect Express) and SRIO (Serial RapidIO).

* * * * *